United States Patent [19]

Boyce

[11] Patent Number: 4,510,694

[45] Date of Patent: Apr. 16, 1985

[54] VEHICLE ALIGNMENT APPARATUS AND METHODS

[75] Inventor: William A. Boyce, Huntington Beach, Calif.

[73] Assignee: Macaster Controls, Inc., Huntington Beach, Calif.

[21] Appl. No.: 566,632

[22] Filed: Dec. 27, 1983

Related U.S. Application Data

[63] Continuation-in-part of Ser. No. 337,252, Jan. 1, 1982, Pat. No. 4,433,489.

[51] Int. Cl.³ .............................................. G01B 5/255
[52] U.S. Cl. ................................ 33/203.18; 33/203.2; 33/288
[58] Field of Search ............ 33/288, 336, 203, 203.17, 33/203.18, 203.19, 203.20, 203.21

[56] References Cited

U.S. PATENT DOCUMENTS 2,627,123  2/1953  Taber .
3,057,074  10/1962  Sidwell ................................ 33/288
3,292,268  12/1966  Knight .
3,426,438  2/1969  Wilkerson .
3,805,399  4/1974  Price .
4,144,652  3/1979  Romak ................................ 33/203.2
4,200,988  5/1980  Hunter .

FOREIGN PATENT DOCUMENTS

1548203  11/1966  Fed. Rep. of Germany .
1547546  10/1968  France ................................ 33/288

Primary Examiner—Harry N. Haroian
Attorney, Agent, or Firm—Fowler, Lambert & Hackler

[57] ABSTRACT

Motor vehicle wheel alignment measuring apparatus, which enables measurement of toe-in, lateral offset and out of square conditions with respect to any given set of tires, comprises pairs of frames adapted to be hung by hooks against the side walls of the exposed tires of a set of tires. A combination of spring and elastic members are provided for engaging the frames with tire sidewalls. Methods include measuring the toe-in of a set of tires, the alignment of all the tires, and vehicle bearing wear, all while the tires are supporting the vehicle.

15 Claims, 12 Drawing Figures

VEHICLE ALIGNMENT APPARATUS AND METHODS

CROSS REFERENCE TO RELATED APPLICATION

This application is a continuation, in part, of application Ser. No. 337,252, filed Jan. 1, 1982, and issued as U.S. Pat. No. 4,433,489 on Feb. 28, 1984.

FIELD OF THE INVENTION

This invention relates to apparatus and methods for measuring alignment relative to the conventional front and rear sets of tires of an automobile, truck or trailer vehicle.

BACKGROUND OF THE INVENTION

Tire wear contributes greatly to automobile and truck operating expenses. Wheel alignment is a very substantial factor in tire wear. Relatively small maladjustments in alignment can easily result in a high rate of tire wear, thus greatly increasing the motor vehicle operating costs.

In addition, bearing wear can make proper alignment, as hereinafter described in greater detail, difficult or impossible with resultant abnormal tire wear.

The alignment problem is complicated because of the use of steering gear which converts rotational steering wheel movement into side-to-side swiveling of the steerable wheels. As discussed in detail in applicant's co-pending U.S patent application, Ser. No. 157,194, filed June 6, 1980 (now U.S. Pat. No. 4,353,568), conventional motor vehicle steering gear typically includes a steering column to which a driver operated steering wheel is attached and in lower regions of which a projecting arm, known as a pitman arm, is connected to a gear box to swing, generally, from fore-to-aft, as the steering wheel is turned.

At each steerable wheel, a "knuckle" assembly is provided which includes a wheel mounting spindle, means for attaching the assembly to the vehicle's suspension system, and a projecting steering knuckle arm or lever enabling swiveling of the knuckle, and hence the wheel, for steering purposes. Two tie rods, usually of equal length, are provided, each being pivotally connected, at a tie rod ball and socket end, to a corresponding one of the steering knuckle arms. Opposite ends of the two tie rods are typically connected, in laterally spaced apart relationship, to intermediate regions of a transverse relay rod, one end of which is pivotally connected to the pitman arm. The other end of the relay rod is pivotally connected to the vehicle frame. Fore-to-aft pivotal movement of the pitman arm, as the steering wheel is turned, is transmitted through the relay rod to the individual tie rods which, through the steering knuckle arms, cause corresponding side-to-side swiveling or steering of the steerable wheels. Typical modern steering systems provide substantial tolerances throughout.

Vehicle steering control is typically provided by various static, angular adjustments of the steerable wheels. Most familiar of these wheel adjustments are caster, camber, steering axis inclination, toe-in, and toe-out in turn (also known as turning radius). Descriptions of these factors may be found in the book entitled *Automotive Suspensions, Steering Alignment and Brakes* by Billiet and Alley (n.p.: American Technical Society, 5th ed. 1974). Overall alignment is also dependent upon the relationships of the various sets of wheels. It is most important that there be no lateral offset between the sets of wheels (i.e., they should "track"), and that each set of wheels be "in square" with one another (i.e., their axes should be parallel).

Among the various alignment factors listed above, the present invention is concerned primarily with toe-in, toe-out in turn, offset and out of square. The importance of these measurements to tire wear will now be explained.

Wheel toe-in is a condition of the tires such that the front regions are closer together than the rear regions. Toe-out is the opposite condition. Neither is desirable in a tire rolling straight ahead, since for minimizing wear, the tires—as they roll—should be exactly parallel. Any amount of toe-in or toe-out causes increased tire wear because it causes sideways tread slipping as the vehicle moves along a road surface. Ideally, the front tires (indeed, all the tires) are precisely parallel in alignment. However, it has long been known that the front tires should be given a slight static toe-in, as measured on prior art apparatus. As the vehicle then begins to move, the resultant forces on the tires cause them to turn outward such that they roll approximately parallel. The resultant forces which cause this tendency to toe-out when rolling are due to the fact that when a vehicle moves from a stationary to a rolling attitude the "lash", or accumulated steering system tolerances, is distributed throughout the front end geometry such that the tires are slightly toed-out with respect to their static alignment.

The difference in angular orientation between the two front tires during a turn is known as "toe-out in turn". This difference in angle, which is typically about 2-3 degrees, occurs because road forces concur with the steering geometry and the inherent tendency to toe-out to cause the inside wheel on the turn to describe a smaller circle than the outside wheel. This is generally a desirable state of affairs, because it tends to foster both tires rolling through the turn rather than skidding. Problems arise, however, in properly setting toe-out in turn so as to minimize destructive forces on the tires. Toe-out in turn is largely controlled by steering arm configuration and positioning. Unless the steering arms are aligned properly, the toe-out in turn will be different in a left turn than in a right turn. According to the well-known Ackerman theory, the steering arms will yield proper, equal toe-out on turn in both directions if the steering ball joints and steering arms lie on the diagonal lines connecting the steering knuckle axes to the so-called "diamond point", which is essentially the center of the rear axle. (In a three-axle vehicle, the diamond point is between the two axles, axle- and frame-center).

A set of drivers "out of square" with its heavy load of torque can easily become a dominant force. This force can have a "bulldozer" effect (because of its tendency to move in a direction perpendicular to the axle) that sets the front of the vehicle sideways. The vehicle operator will then unknowingly react with a steering wheel change to compensate. When the torque changes, another steering wheel compensation is necessary. The operator will normally interpret this as caused by road change, so he is not put on notice that the tires are developing an unusual wear pattern, in which one wears a toe-out pattern and the other a toe-in pattern. For example, a set of drivers $\frac{1}{2}°$ out of square will put the outside dual driving tires of a truck about $\frac{1}{2}''$ out of square, i.e., one ¼" ahead and the other ¼" behind a true vehicle transverse axis. Because of the above-described tendency of the drivers (rear tires) to go straight under heavy torque loads, the ½° out of square condition will cause the front tires to be dragged sideways. If a truck has only a 20' span, the front tires can be dragged sideways 2" every 20' of forward travel. The destructiveness to a set of tires is obvious.

To ensure proper toe-out on turn for both turning directions, the front set of wheels must not only be in square with the rear set of wheels (assuming a two-axle vehicle), but the two sets of wheels must also be "tracking", that is, there must be no lateral offset between them. When both these conditions obtain, the sets of wheels are said to be "in diamond", and toe-out in turn will be correctly established.

Various devices and methods for measuring vehicle wheel alignment are known to those skilled in the art. For instance, the Price U.S. Pat. No. 3,805,399, issued Apr. 23, 1974, disclosed a pair of triangular frames, formed of metal rod stock. The patentee therein teaches that the triangular frames are each adapted to be urged by a pair of springs into engagement against the sidewalls of a pair of wheels. The triangular frames are used to measure toe-in in conjunction with elongate rods disposed across a vehicle. The frames are also used to support means for measuring camber, caster, and rear wheel tracking. Similarly, Knight U.S. Pat. No. 3,292,268, issued Dec. 20, 1966, also discloses a triangular frame; however, it is formed instead of square rod stock. Still another prior art device utilizes a light beam and mirror arrangement to reflect alignment readings onto a wall chart. It is designed expressly for use in a shop environment.

However, several important problems remain largely unsolved by the prior art. For instance, accuracy of measurement is at best questionable because the measuring is generally done under highly artificial conditions that would only accurately reflect true driving conditions under the most fortuitous of circumstances. Also, prior devices which utilize triangular frames that are adapted to be placed on tire sidewalls are often of such shape and height as to severely limit the types of vehicles and/or tires with which they may be used; they also are sensitive to precise placement of the suspending hooks on the tires in order to place the frames into proper engagement with the sidewalls of the tires. Additionally, most prior devices make no provisions for assessing the amount by which the various sets of wheels may be misaligned, with respect to one another, or to the vehicle frame.

SUMMARY OF THE INVENTION

Wheel alignment measuring apparatus of the present invention includes a pair of frames, each of the frames adapted for engaging a sidewall of a tire and biasing means for engaging the frames with the tire sidewalls of coaxially mounted tires, while the coaxially mounted tires are supporting the vehicle on a road surface or the like.

The biasing means includes a first and second spring and a first and second elastic member.

In accordance with the present invention, the first spring and the first elastic member are connected in parallel between front portions of each frame and the second spring and second elastic member are connected in parallel between rear portions of each frame.

More particularly, the first and second spring and the first and second elastic member have lengths substantially less than the distance between the coaxially mounted tires. Since the length of the elastic member is substantially less than the distance between the coaxially mounted tires, the elastic member is kept separated from grease-carrying frame and steering linkages proximate each of the tires. This is important because oil, dirt and grease accumulation on the elastic members make them more difficult to handle and may cause deterioration of the elastic properties of the elastic members.

While the first spring and first elastic member are connected in parallel, and the second spring and second elastic member are connected in parallel, the first and second springs are configured in order that the first and second spring provide the majority of the force necessary for engaging the frames with the tire sidewalls. This is important in extending the life of the elastic member.

If an elastic member were utilized separately, as it can be, more stretching of the elastic member is necessary to supply the sufficient force to engage the frames with the tire sidewalls. This may necessitate longer and/or thicker elastic members and require substantially more stretching of the elastic members, which may lead to a reduced life expectancy or usefulness of the elastic members.

Also, in accordance with the present invention, the wheel alignment measuring apparatus may further include center mark means attached each to the elastic members for optically indicating the midpoint between the coaxially mounted tires. The center mark means includes a pointer clamped to an edge portion of the elastic member midway between the ends of the elastic member. It is important that the pointer be attached to the elastic member in a manner which does not impair consistent stretching of the elastic band. It has been found that by clamping the pointer to edge portions of the elastic band, the band may be stretched without significant distortion, i.e., uniform stretching of the elastic member is accomplished.

First and second wire means are provided to connect, respectively, opposite ends of the first spring and first elastic members and opposite ends of the second spring and second elastic members to the front and rear portions of the frames. A plurality of regularly spaced apart stops are fixed on the wire means, in order to enable the biasing means to be connected between coaxially mounted tires having different distances therebetween.

The apparatus of the present invention is useful in the practice of the method of the present invention for determining if a pair of coaxially mounted tires are parallel to one another while coaxially mounted tires are supporting a vehicle, which includes the steps of disposing a frame against an outside sidewall of each two coaxially mounted tires, extending first biasing means between front portions of each frame. The first biasing means include first wire means having a plurality of regularly spaced apart stops fixed thereon for attaching the first biasing means to the frames.

The second biasing means is extended between rear portions of each frame and the second biasing means includes second wire means having a plurality of regularly spaced stops therein for attaching the second biasing means to the frames.

The distance between the regularly spaced stops in the first wire means between the coaxially mounted tires are measured and the distance between the regularly spaced stops in the second wire means between the coaxially mounted tires are measured and the results of these measurements are compared in order to determine if the pair of coaxially mounted tires are parallel to one another.

The present invention also includes a method for determining vehicle wheel bearing wear, which includes the first step of rolling a vehicle having coaxially mounted tires in one direction and braking the vehicle to a stop.

Thereafter, a frame is disposed against outside sidewall of each of two coaxially mounted tires and first biasing means is extended between front portions of each frame, the first biasing means including first wire means having regularly spaced apart stops for attaching the first biasing means to the frames.

The second biasing means is extended between rear portions of each frame and the second biasing means also include second wire means having regularly spaced apart stops thereon for attaching said second biasing means to the frames. The distance between the regularly spaced stops is measured in the first wire means and the second wire means.

Thereafter, the frames and biasing means are removed from the coaxially mounted tires and the vehicle is rolled in an opposite direction and braked to a stop. Following opposite movement of the vehicle, a frame is disposed against the outside sidewalls of each of the two coaxially mounted tires and the first and second biasing means are extended between the frames as hereinabove described.

The measurements are made between the regularly spaced stops between the coaxially mounted tires, and the results of the hereinabove measurements are compared to determine differences in the measurements, which are attributed to bearing wear.

Also, in accordance with the present invention, a method is provided for making alignment measurements relative to front and rear sets of tires of a vehicle, which includes the steps of: disposing a frame against an outside sidewall of each of one set of coaxially mounted tires; extending first biasing means between a front portion of each frame, said first biasing means including center marker means including a pointer having an aperture therein; extending second biasing means between a rear portion of each frame, said second biasing means including center marker means including a pointer having an aperture; disposing a frame against an outside sidewall of each of another set of two coaxially mounted tires; extending third biasing means between a front portion of each frame or said second set of coaxially mounted tires, said third biasing means including center marker means including a pointer having an aperture therein; and, extending fourth biasing means between a rear portion of each frame on said second set of coaxially mounted tires, said fourth biasing means including a pointer having an aperture therein.

Thereafter, the method includes a projecting straight line defined by optically sighting a pointer of one of the first or second biasing means through the aperture of another of the first or second biasing means; projecting a straight line defined by optically sighting a pointer of one of the third or fourth biasing means through the aperture of another of the third or fourth biasing means, and, comparing the hereinabove projections.

It is apparent that the present invention enables quick, economic and precise measurements, by one person and provides measurements that may be easily cross-checked for accuracy.

BRIEF DESCRIPTION OF THE DRAWINGS

A better understanding of the present invention may be gained from a consideration of the following detailed description taken in conjunction with the accompanying drawings in which:

FIG. 4 is a simplified plan view of a set of tires exhibiting exaggerated toe-in;

DESCRIPTION OF THE PREFERRED EMBODIMENT

Figure 1:
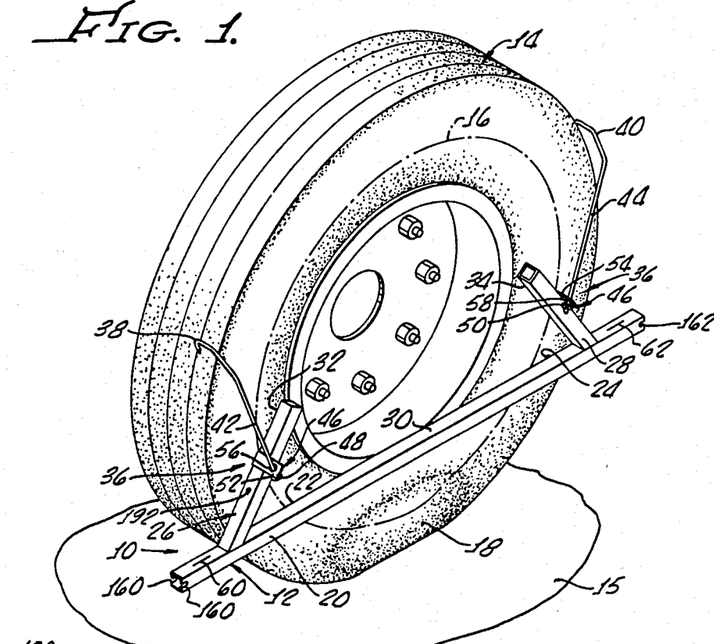
FIG. 1 is a perspective view of one of the frames of the present invention disposed on an exemplary motor vehicle wheel.
Figures 2, 3:
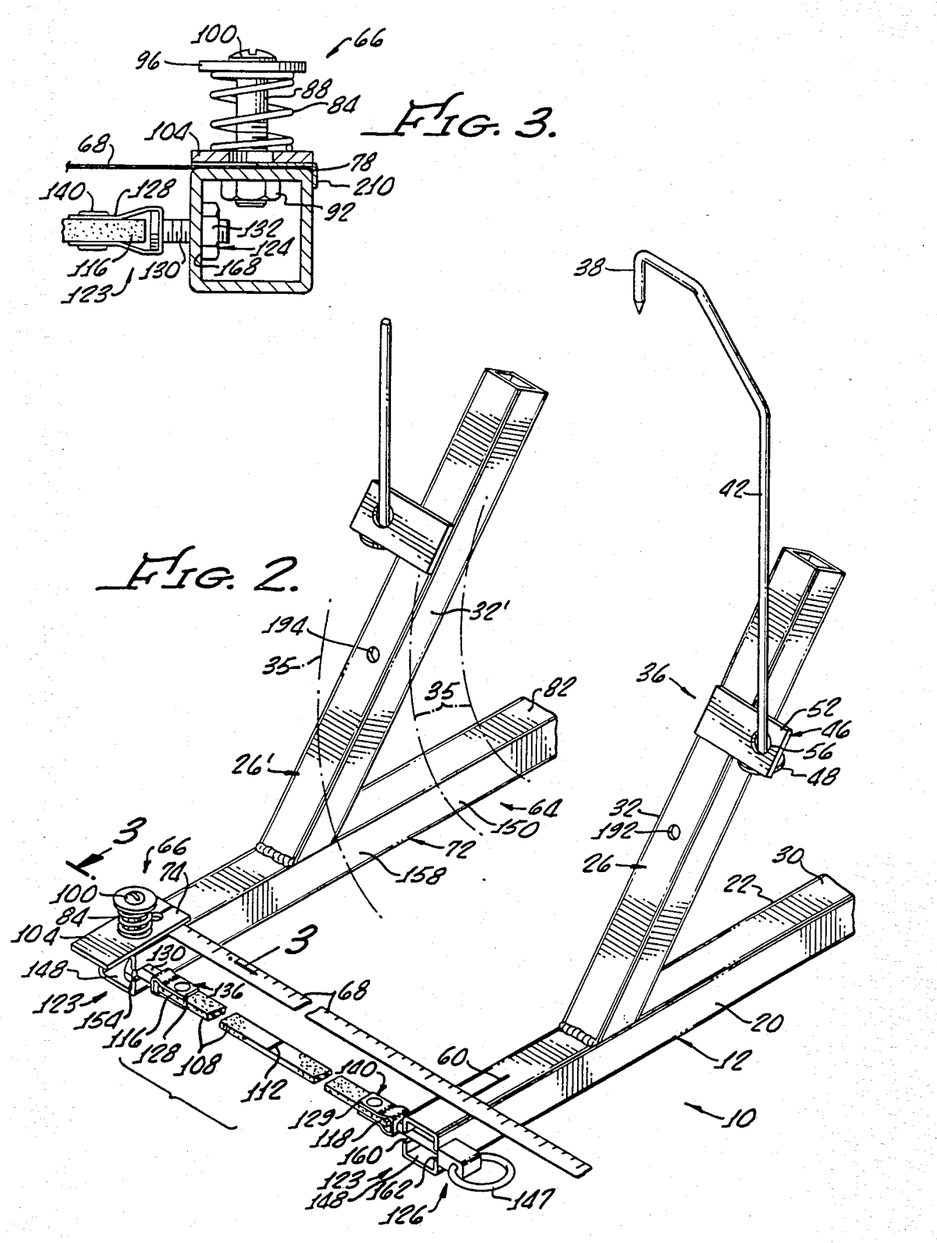
FIG. 2 is a partially cut-away view of two of the frames of the present invention, between the corresponding ends of which are disposed a conventional tape measure and an elastic band.
FIG. 3 is an end view of one of the cross bars of FIG. 2, taken along line 3—3 thereof.

In FIGS. 1 and 2 there is shown wheel alignment measuring apparatus 10 of the present invention. With reference more particularly to FIG. 1, a frame 12 is shown disposed on an exemplary tire 14 resting on a road surface 15.

For ease of reference, it will be understood that terms herein such as "front", "rear", and so forth are taken with reference to the front and rear of an automobile, truck or trailer vehicle. The terms such as "inner" and "outer" refer, respectively, to directions toward the longitudinal axis of such a vehicle or away from such axis, unless qualified by the context.

A line 16 is shown in phantom lines in FIG. 1, which line 16 describes the outer circular side wall periphery of the tire 14, that is, the line which would contact a vertical plane which abutted the side wall of the tire 14. Naturally a precise circle would only obtain under ideal circumstances—when there was no bulge 18 in the tire 14 necessarily resulting from its carrying the weight of a vehicle (not shown)—but above the bulge 18 the line 16 describes a circle with adequate precision.

The frame 12 more particularly comprises an elongate cross bar 20 which is formed of tubular steel of square cross-section. The length of the cross bar 20 is somewhat greater than the diameter of the tire 14. The cross bar 20 includes coplanar surface 22 and 24 (FIG. 5) disposed in spatial relationship to engage different locations on the circular side wall periphery 16 of the tire 14. The frame 12 also includes a pair of stub members 26 and 28. The stub members 26 and 28 are formed of tubular steel of square cross-section, and are rigidly attached, as by welding, to the upper surface 30 of the cross bar 20. The stub members 26 and 28 are disposed intermediate the opposite ends of the cross bar 20, remote from one another and extending upwardly from the cross bar 20 and inwardly toward its center. The stub members 26 and 28 have surfaces 32 and 34, respectively (FIG. 5), which are coplanar with the coplanar surfaces 22 and 24 of the cross bar 20. The coplanar surfaces 32 and 34 of the stub members 26 and 28 are disposed in spatial relationship to engage different locations on the circular side wall periphery 16 of the tire 14. As may be seen in FIG. 2, there are shown a number of outer sidewall periphery lines 35 which illustrate graphically the range of tire sizes with which the apparatus of the present invention may effectively be used, all the while maintaining multiple coplanar surface contact between a frame and a tire sidewall periphery. If even greater range of usefulness is desired, larger or smaller frames may be provided.

The frame 12 also includes means 36 for detachably hanging the frame 12 on the tire 14 in loose proximity thereto. The means 36 for detachably hanging the frame 12 more particularly comprises a pair of hooks 38 and 40 having shanks, 42 and 44, respectively, and means 46 connecting the shanks 42 and 44 to respective stub members 26 and 28 near the upper ends thereof. The hooks 38 and 40 are each formed of a unitary piece of steel, and are provided on the ends of the shanks 42 and 44 with relatively large diameter washers 48 and 50 respectively. The washers 48 and 50 are rigidly secured to the hooks 38 and 40.

The means 46 connecting the shanks 42 and 44 to the stub members 26 and 28 comprises a pair of ears 52 and 54 rigidly disposed on respective stub members 26 and 28 intermediate the ends thereof. The ears 52 and 54 define holes 56 and 58, respectively, the diameters of which holes 56 and 58 are substantially larger than the outside diameters of corresponding hooks 38 and 40 which are disposed therethrough, and smaller than the outside diameters of the washers 48 and 50. Thus the connecting means 46 permits at least limited universal excursion of the hooks 38 and 40 whiel capturing the shanks 42 and 44 thereof.

The frame 12 also includes a pair of index marks 60 and 62 on the upper surface 30 of the cross bar 20, at opposite ends thereof, and extending longitudinally of the cross bar 20. As will be more fully appreciated when the operation of the frame 12 is discussed below, the index marks 60 and 62 are equally spaced from the coplanar surfaces 22 and 24 of the cross bar 20 as measured transversely of the cross bar 20.

The precise locations of the stub members 26 and 28 on the cross bar 20, the length and angular orientations of the stub members 26 and 28, and the length of hooks 38 and 40 are all chosen so as efficiently and effectively to cooperate with the dimensions of vehicle tire 14, and so as to allow use of the frame 20 with tires of various sizes within a range. The relationships of the distances, lengths and angles will become more apparent as the function of the frame 12 is more fully described below.

Figure 4:
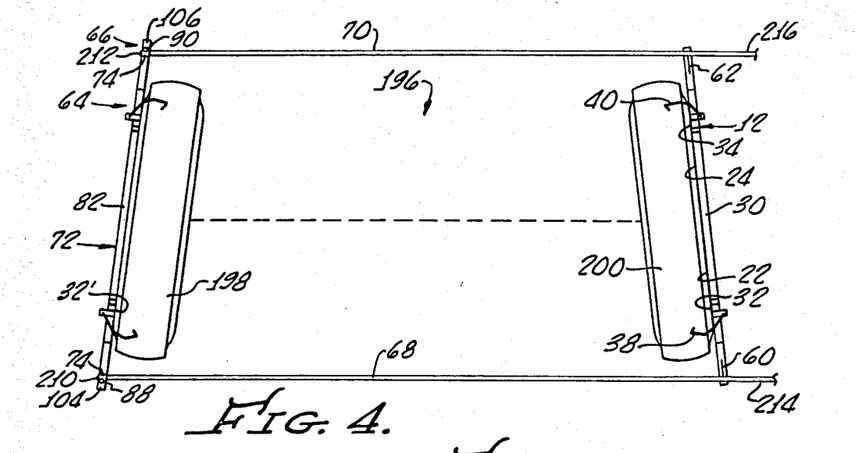
Figure 5:
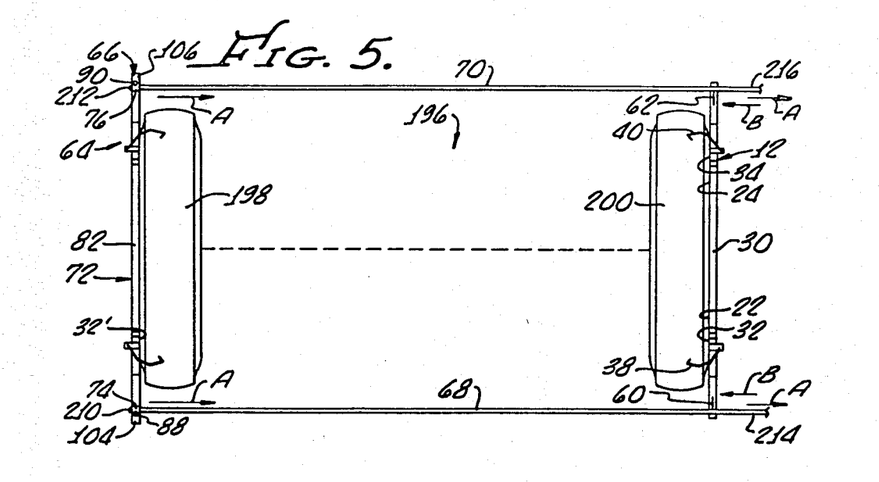
FIG. 5 is a simplified plan view of a set of motor vehicle wheels with the frames of the present invention mounted thereon.
Figure 6:
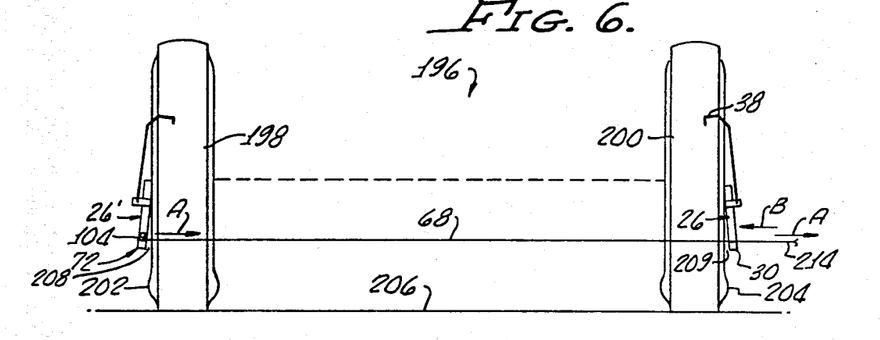
FIG. 6 is an elevation view of a set of tires 20 with the frames of the present invention disposed thereon.

With reference especially to FIGS. 2 through 5, it can be seen that the wheel alignment measuring apparatus 10 of the present invention comprises at least one pair of frames, as frames 12 and 64. In FIG. 4 there is shown the wheel alignment measuring apparatus 10 of the present invention disposed on a pair of wheels with exaggerated toe-in. FIG. 5 depicts the same apparatus 10 on a pair of wheels that are aligned correctly, that is, without either toe-in or toe-out. And FIG. 6 depicts the operation of the apparatus 10 in measuring toe-in.

The complementary frame 64 is identical with the frame 12 as thus far described, with the exception that the frame 64 does not include index marks such as index marks 60 and 62 of the frame 12. The precise relationship between the various coplanar surfaces of a given frame may be more easily seen by taking reference to FIGS. 2 and 5. It should first be appreciated that the frames 12 and 64 of the present invention are substantially symmetrical about a central transverse axis. Each of the cross bars 12 and 64 has four coplanar surfaces, two on the respective cross bar, and one each on respective stub members. Thus, the frame 64 has a coplanar surface 32' on stub member 26' and a coplanar surface 150 on the cross bar 72, both of which are coplanar with each other, as well as with the two additional coplanar surfaces at the opposite end (not shown in the cut-away view of FIG. 2, but indicated in the elevation view of FIG. 5) of the cross bar 72.

The frame 64 includes hold-down means 66 for detachably capturing the free ends of a pair of conventional tape measures 68 and 70 (See FIG. 3). Thus, the cross bar 72 of the frame 64 includes near opposite ends thereof, a pair of flat steel pressure plates 74 and 76 for clamping the free ends of the pair of tape measures 68 and 70 against corresponding corner surfaces 78 and 80 of the cross bar 72. The pressure plates 74 and 76 are biased against the upper surface 82 of the cross bar 72 by compression springs 84 and 86, which are held in place by any well known means. In the preferred embodiment as herein described, the springs 84 and 86 are held in place by bolts 88 and 90 which bolts are secured through the upper surface 82 of the cross bar 72 by nuts 92 and 94 at their threaded ends and by the abutment of washers 96 and 98 with the enlarged heads 100 and 102. Thus the pair of spring-loaded pressure plates 74 and 76 mounted near opposite ends of the cross bar 72 of the frame 64 are provided for clamping the free ends of the pair of the tape measures 68 and 70 against corresponding corner surfaces 78 and 80 of the cross bar 72. The pressure plates 74 and 76 are provided with extensions 104 and 106 which overhang the opposite ends of the cross bar 72 in order to provide fulcrum action so that the pressure plates 74 and 76 may be moved out of abutment with the upper surface 82 of the cross bar 72, thus to engage or release tape measures 68 and 70.

Figures 7, 8:
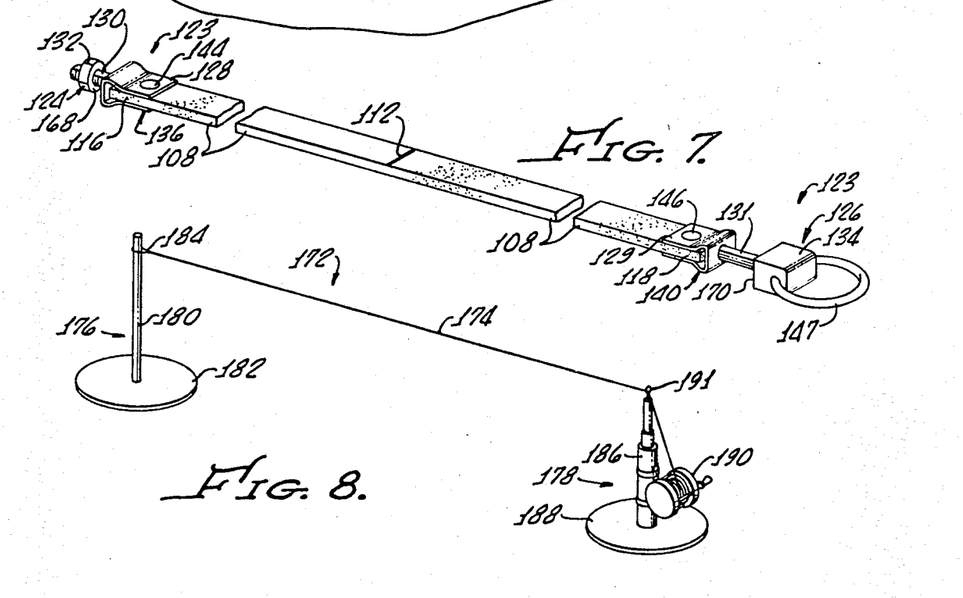
FIG. 7 is a cut-away perspective view of the elastic band of the present invention.
FIG. 8 is a perspective view of the line projecting means of the present invention.

The wheel alignment measuring apparatus 10 also includes a pair of identical elastic bands, only one of which, 108, is shown in FIGS. 2 and 7. The elastic band 108 comprises a $\frac{1}{8}''\times\frac{3}{4}''$ flat band of pur gum rubber. The elastic band 108 in the unstretched state is of length slightly less than the width of a vehicle (not shown) with which it is to be used. The elastic band 108 has its center marked, as indicated by reference numeral 112, midway of its ends 116 and 118.

Connection means 123 are provided at the free ends 116 and 118 of the elastic band 108, disposed equidistant from the center mark 112. As may be seen most clearly in FIG. 7, the connection means 123 includes button members 124 and 126, and means 128 and 129 coupling the button members 124 and 126 to the elastic band 108. The button members 124 and 126 have relatively thin neck portions 130 and 131, and relatively large head portions 132 and 134. The length of the neck portion 128 is slightly greater than the width of the walls of the cross bars 20 and 72. The length of the neck portion 130 is slightly greater than the outer width of the cross bars 20 and 72. The connection means 123 also include two pairs of flat clamps, 136 and 140, which are connected to the ends 116 and 118 of the elastic band 108 by bolts 144 and 146, and which are rigidly connected to respective neck portions 128 and 130. The bottom member of 126 includes a ring 147 to facilitate stretching of the elastic band 108.

As shown in FIG. 2, the cross bars 20 and 72 include means 148 for detachably securing near opposite ends therof, and at corresponding locations parallel or even with the coplanar surfaces 22 and 24 of the cross bar 20 and coplanar surfaces 150 and 152 of the cross bar 72, as measured transverely of the cross bars 20 and 72, the connection means 123 at the free ends of a pair of elastic bands such as band 108. The means 148 for detachably securing the connection means 123 includes a pair of elongate open slots 154 and 156 in the inner wall of 158 of the cross bar 72, and t2o pairs of elongate open slots 160 and 162. The pairs of slots 160 and 162 are parallel, and are provied in the inner and outer walls of the cross bar 20 on ends thereof. The means 148 also includes the relatively large abutment surfaces 168 and 170 on the head portions 132 and 134 for engaging the cross bars 20 and 72 by way of engagement with respective ones of the open slots 154, 160, and 162.

Figure 9:
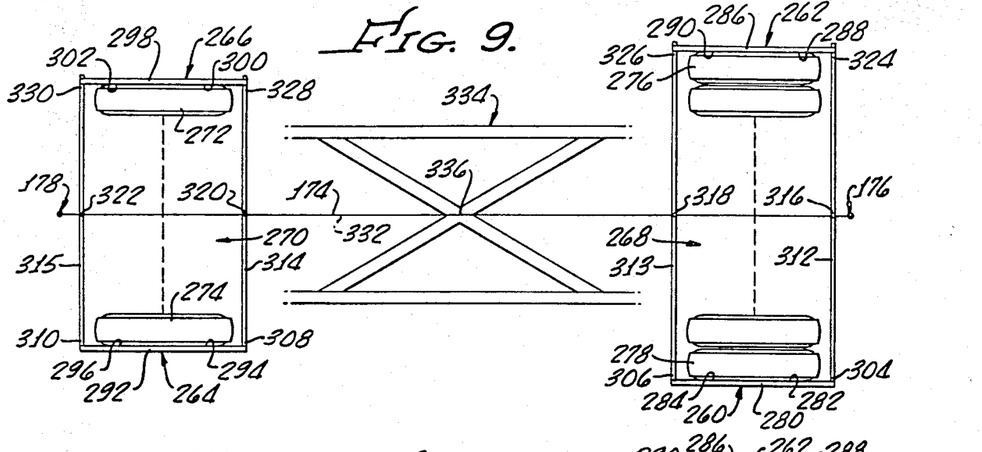
FIG. 9 is a simplified plan view of an exemplary front and rear set of motor vehicle tires in perfect alignment.

Referring now to FIGS. 8 and 9, there is shown a straight-line projection means 172 which includes a length of string 174, preferably carpenter's chalkline, and a pair of supports 176 and 178. The first support 176 more particularly comprises an upright metal post 180, rigidly connected to a metal base 182 by means of which connection to the post 180 is disposed in a vertical attitude when the base 182 rests on a horizontal surface such as the ground. The top of the post 180 is adapted to releasably retain free end 184 of the string 174. In the preferred embodiment the free end 184 of the string 174 is simply looped and placed over the post 180. The post 180 is about 12" in height.

The second support 178 more particularly comprises an upright metal post 186 which is rigidly connected to a metal base 188 by means of which connection to post 186 is disposed in a vertical attitude when the base 188 rests on a horizontal surface. The second support 178 also includes a reel 190 containing a quantity of the string 174 which reel 190 allows the playing out or reeling in of various amounts of the string 174. The string 174 may be played off of the reel 190 through a vertical adjustable eyelet 191. It is contempleated that the reel 190 be comprised of a conventional fishing reel such as is commonly available commercially. The post 186 is adjustable from about 9" to about 12" in height. The projection means 172 thus is adapted to describe a continuous set of horizontal straight lines of height about 9" to 12".

It may be observed in FIGS. 1 and 2 that the stub members 26 and 28 of the frame 12 are provided with holes 192 and 194 through the upper surfaces thereof. The holes 192 and 194 are of such size as to frictionally but easily releasably accommodate the hooks 38 and 40 respectively so as to retain the points therein when the apparatus is not in use. All of the stub members of the present invention are provided with such holes.

Figure 12:
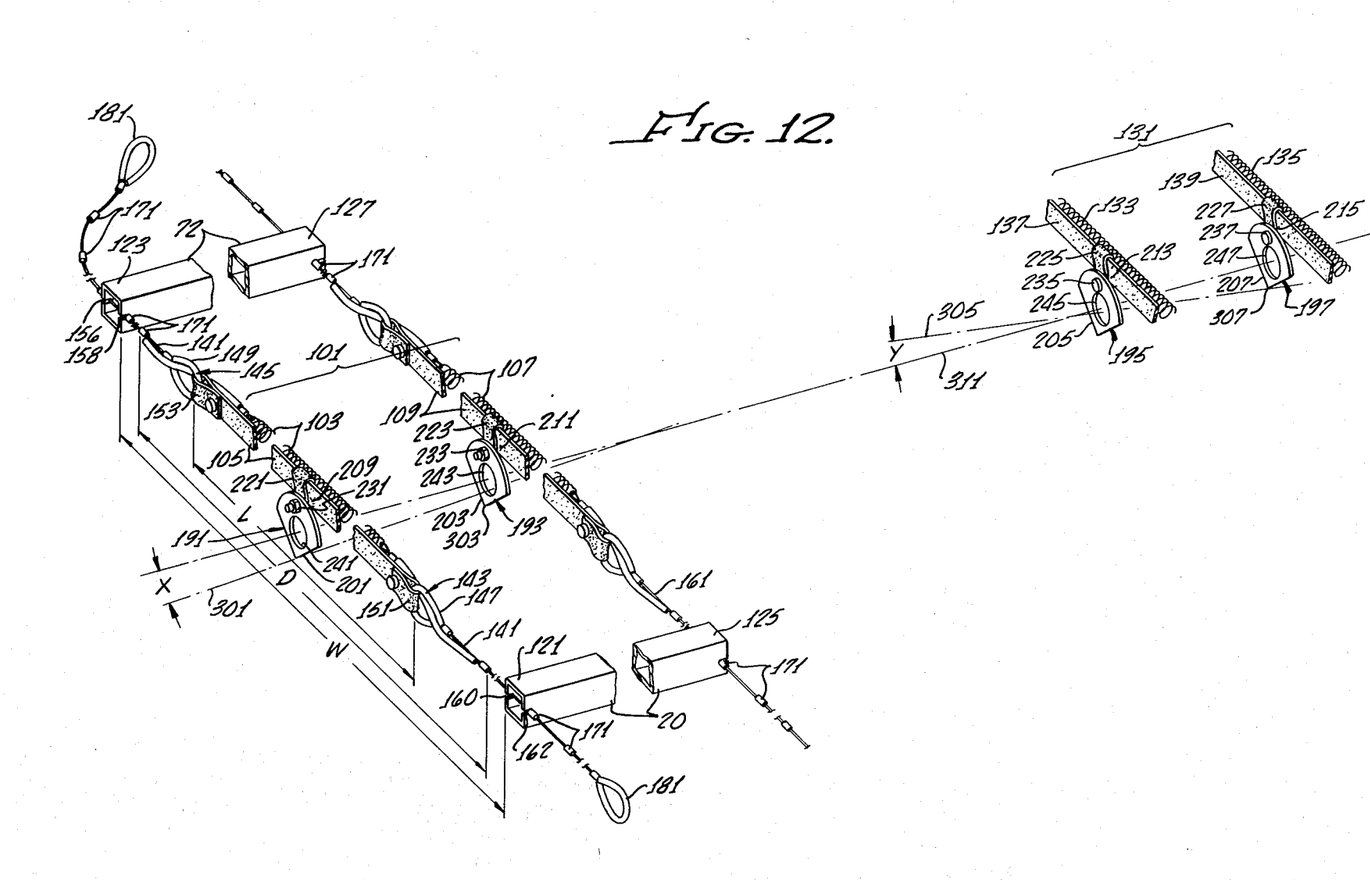

Turning now to FIG. 12, there is shown yet another emodiment of the present invention. For convenience, common character references shown in FIG. 12 refer to similar components shown in other figures of this specification.

Generally, in accordance with the present invention, wheel alignment measuring apparatus comprises a pair of frames 20, 72, each adapted for engaging a sidewall of a tire (not shown in FIG. 12) and biasing means 101 for engaging the frames 20, 72, with the tire sidewalls of coaxially mounted tires (not shown in FIG. 12). The biasing means includes a spring 103 and an elastic member 105 with the spring and the elastic member being connected in parallel between the frames 20, 72.

Specifically, the biasing means 101 may include a second spring 107 and a second elastic member 109. The first spring 103 and first elastic member 105 are connected in a parallel fashion between a front portion 121, 123 of each of the frames 20, 72, and the second spring 107 and second elastic member 109 are connected in a parallel fashion between a rear portion 125, 127, of the frames 20, 72.

Partially shown in FIG. 12 are additional biasing means 131, which are connected in a similar fashion to frames (not shown) engaging a second set of coaxially mounted tires (not shown), the latter biasing means being shown in an illustrative manner only for demonstrating a method of the present invention, as will be hereinafter discussed in greater detail.

All of the springs 103, 107, 133, and 135, and more importantly, all of the elastic members 105, 109, 137, and 139 have a length, L, significantly less than the distance between the coaxially mounted tires, as indicated by the spacing, W, of the frame 20 and 72. This is important in that the elastic member and the spring are removed from grease and oil bearing surfaces proximate the vehicle tires.

The springs 103, 107, 133, and 135 are configured in order that the springs provide the majority of the force for engaging the frames 20 and 72 against the sidewalls of the tire, thereby relieveing the elastic members 105, 109, 137, and 139 from supporting the entire load represented by the engagement of the frames with the tires, as hereinbefore described with other embodiments of the present invention.

A wire, or wire cable 141, attached to opposite ends of the spring 103 and elastic member 105 by loops 143 and 145, provide means for connecting the spring and elastic member is parallel between the coaxially mounted tires and frames. The wire means 141 may have a protective coating 147, 149 thereon, in order to protect looped ends 151 and 153 of the elastic member 105. Simialrly, wire means (not shown) connect the springs 107, 133, 135, and the elastic members 109, 137, and 139 to the frames.

In addition, the wire means 141, as well as the wire means 161, and wire means (not shown) associated with the biasing means 131, are fitted with regularly spaced apart stops 171, to enable the springs 103, 107, 133, and 135 and elastic members 105, 109, 137, and 139 to be connected between coaxially mounted tires, having different distances therebetween, by their insertion into slots 156, 158, 161, 162 of the frames 20, 72. Looped end portions 181 enable an operator to manually stretch the springs, as hereinbefore described in detail, to permit snugging of the frames 20, 72 against the sidewalls of the tire.

The stops 171 provide an additional feature by enabling the apparatus of the present invention to be used in the method for measuring vehicle wheel bearing wear, as will be hereinafter described in greater detail.

Center mark means 191, 193, 195, 197 are provided for optically indicating the mid-point between the coaxially mounted tires. The center mark means include pointers 201, 203, 205, 207, clamped to edge portions 209, 211, 213, 215, by means of straps 221, 223, 225, 227 and a machine screw 231, 233, 235, 236, or the like. The pointers 201, 203, 205, 207, each have an aperture 241, 243, 245, 247, to enable forward and rearward optical projections of axle position and direction for each of the tires in accordance with the present invention.

OPERATION

Turning now primarily to FIGS. 4–6, the use of the above-described wheel alignment measuring apparatus will be explained. With reference to the exemplary set of vehicle tires indicated generally by reference numeral 196 of a vehicle which is not shown (for purposes of clarity), having left tire 198 and right tire 200, a pair of frames 12 and 64 of the present invention is shown disposed on the exposed tires 198 and 200. The tires 198 and 200 both exhibit bulges 202 and 204 necessarily resulting from their bearing the weight of the vehicle (not shown) while they rest on the ground 206.

However, it should be understood that in use, an operator (not shown) first hangs the frame 12 on the tire 200. The operator places the hooks 38 and 40 into the tire 200 on opposite upper quadrants thereof. It is especially important that the hooks 38 and 40 be placed so as to ensure that the cross bar 20 is well above the bulge 204 and so that the frame 12 hangs in loose proximity to the circular side wall periphery (not shown) of the tire 200. If the frame 12 is hung so low on the tire 200 that the cross bar 20 would contact any part of the tire bulge 204, specious measurements would result because one-point rather than two-point contact would be obtained with the circular side wall periphery. Normally the operator ensures that the cross bar 20 is approximately level by visual examination. It is not necessary that the coplanar surface 22, 24, 32 and 34 of the frame 12 abut the circular side wall periphery; it is allowable, however. But it is preferable that there be a slight gap between the cross bar 20 and the circular side wall periphery as indicated at 208 in FIG. 6, the reason for which will be explained in a subsequent paragraph.

The operator next stretches a pair of conventional metal tape measures 68 and 70 out on the ground beneath the vehicle, one tape 70 immediately in front of the tires 198 and 200, so that the free, tab ends 210 and 212 of the tapes 68 and 70 are disposed near the left tire 198, and the reel ends 214 and 216 are disposed near the right tire 200.

The operator then moves around to the left tire 198 and places the frame 64 on the left tire 198 in a similar manner to that described above with respect to the right frame 12. Normally, the frame 64 would be visually adjusted to be approximately level to the deck. However, should it be necessary in order to clear various undercarriage elements, both the frame 12 and the frame 64 may be tilted slightly, so long as they are adjusted to be parallel one to the other.

The operator then attaches the tab ends 210 and 212 of the tape measures 68 and 70 to hold-down means 66 of the frame 64 by capturing the tab ends 210 and 212 beneath the respective pressure plates 74 and 76 such that the downturned tabs 210 and 212 are clamped against corresponding corner surfaces 78 and 80 of the cross bar 72.

Back on the right side of the vehicle, the operator picks up the tapes 68 and 70 near the reel ends 214 and 216 thereof, and, gently but firmly, manually snugs the cross bar 20 of the frame 12 against the exposed side wall of the tire 200 (arrow "B" in FIGS. 6 and 7) while simultaneously grasping and exerting approximately equal tension on the tape measures 68 and 70 so as to similarly snug the cross bar 72 of the frame 64 against the exposed side wall of the tire 198 (arrow "A" in FIGS. 6 and 7). It is most important that the operator "feel" that the tension in the two tapes 68 and 70 is equal, because a relatively small difference therein may be enough to cause one end of the cross bar 20 or the cross bar 72 to "cut" into the respective tire, thus unbalancing the measurement. In practice it has been found that an operator can "feel" accurately enough that the error from improper (or unequal) tensioning of the tapes 68 and 70 can be limited to no more than about 1/32" to 1/16".

Finally, the operator, while maintaining constant and equal tension as described in the foregoing paragraph, notes the tape measure readings at corresponding locations on the frame 12 equally spaced from or even with the coplanar surfaces 22 and 24 on the cross bar 20 of the frame 12, but preferably by reference to the two index marks 60 and 62 on the top surface of the cross bar 20. Comparison of the two readings obtained will give the amount of toe-in (or toe-out) in linear units, normally inches.

Figure 10:
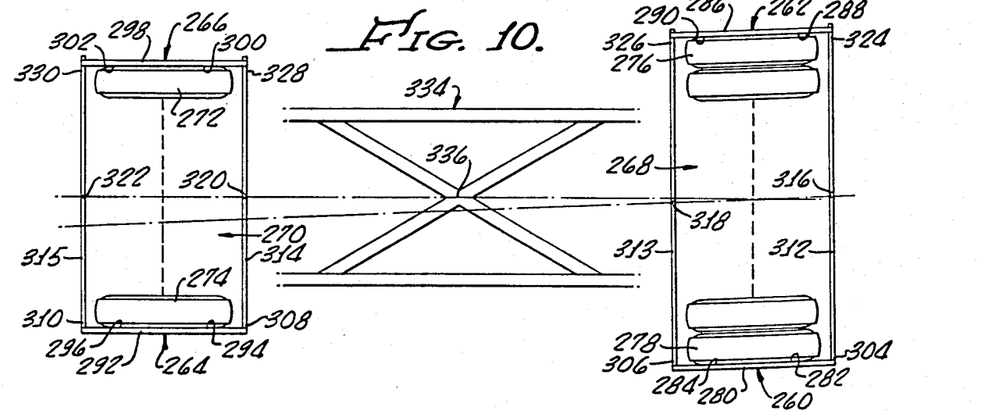
FIG. 10 is a simplified plan view of an exemplary front and rear set of motor vehicle tires in exaggerated misalignment.
Figure 11:
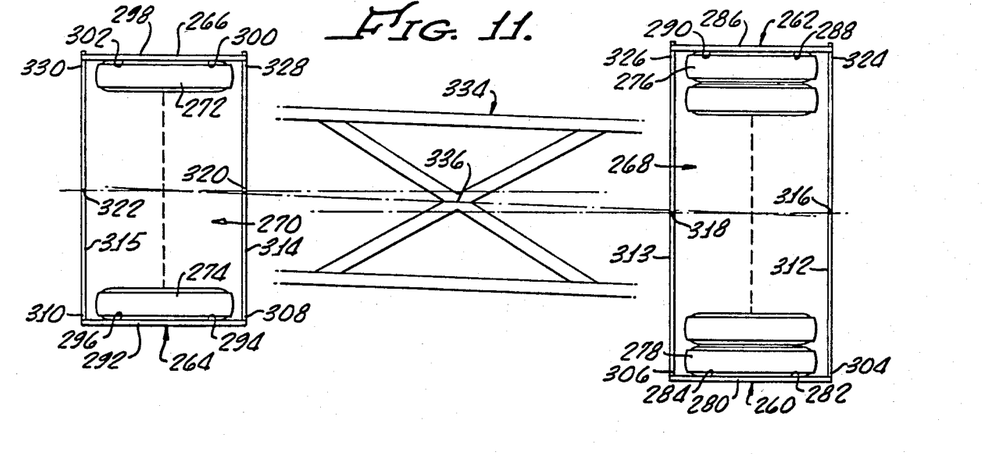
FIG. 11 is a simplified plan view of a set of motor vehicle tires with rear tires out of square and exhibiting resultant offset; and, FIG. 12 is a perspective view of another embodiment of the present invention, showing biasing means having a spring and an elastic member connected in parallel between the front portion of the frames, along with center mark means, including a pointer having means defining an aperture therin to enable optical sighting therethrough with other biasing means of the present invention.

With reference now to FIGS. 9, 10 and 11, there are symbolically illustrated additional steps in the method of the present invention. FIG. 9 shows two sets of wheels in perfect alignment. FIG. 10 shows two sets of wheels in which one set (the rear) is out of square with respect to the other set. FIG. 11 shows two sets of wheels in which one set is offset from the other. For the sake of clarity, new reference numerals will be assigned to the various elements of the apparatus 10 as shown in these figures. Thus, two pairs of first and second frames 260 and 262, and 264 and 266, respectively, are shown mounted on a rear and front chosen set of tires 268 and 270. (The first frames correspond to frame 64 in the foregoing, and the second frames to frame 12). The front, or steerable, set of tires includes right tire 272 and left tire 274. The rear, or driving, set of tires includes a right exposed tire 276 and a left exposed tire 278. The first frame 260 includes a cross bar 280 with coplanar surfaces 282 and 284. The second frame 262 includes a cross bar 286 with coplanar surfaces 288 and 290. The first frame 264 includes a cross bar 292 with coplanar surfaces 294 and 296. The second frame 266 includes a cross bar 298 with coplanar surfaces 300 and 302.

Although two pairs of frames of the present invention are shown already in place, this is for ease of illustration, and it will readily be realized, in reading the subsequent description of the additional method steps, that the foregoing steps relating to the hanging of the frames and the measurement of toe-in are assumed already to have been accomplished with respect to the rear set of tires 268.

Hence the operator (not shown) hangs the frames 264 and 266 on the front set of wheels 270 and performs all of the above-described steps relating to measuring the toe-in of the set of tires 270. (N.B. For clarity of illustration, no tape measures are shown in FIGS. 9-11. It is to be understood, however, that they are used in the toe-in measuring part of the method, and can remain in place for the remaining steps thereof.)

The operator then secures near opposite ends of cross bars 280 and 292 of the first frames 260 and 264 at corresponding positions equally spaced from or even with the coplanar surfaces 282 and 284, and 294 and 296, of the cross bars 280 and 292, first ends 304, 306, 308 and 310 of two pairs of elastic bands 312, 313, 314, 315, each elastic band being adapted to stretch across the width of the vehicle in response to relatively minimal pulling force, and each band having a center mark 316, 318, 320 and 322 located midway of its length. In the preferred embodiment the elastic bands 312, 313, 314 and 315 will be secured as described above with respect to the frames 12 and 62.

Next, the operator extends the elastic bands underneath and across the vehicle (not shown) to the cross bars 286 and 298 of the second frames 262 and 266 on the other side of the vehicle, and manually grasps second ends 324, 326, 328 and 330 of the elastic bands 312, 313, 314, 315, and pulls first one pair of the elastic bands and then the other, and secures the second ends 324, 326, 328 and 330 near opposite ends of the cross bars 286 and 298 of the second frames 262 and 266 and corresponding positions equally distant from or even with the coplanar surfaces 288 and 290, and 300 and 302 of the cross bars 286 and 298.

The operator then projects a straight line 332 defined by the center marks 316 and 318 of the elastic bands 312 and 313 on the set of frames 260 and 262 hung on the rear set of tires 268 past the center marks 330 and 332 of the elastic bands 314 and 315 on the set of frames 264 and 266 hung on the front set of tires 270.

All that remains is for the operator to note the positions of the center marks 320 and 322 of the elastic bands 314 and 315 on the set of frames 264 and 266 hung on the front set of tires 270 with respect to the projected straight line 332. By so noting the positions of the center marks 320 and 322 with respect to the line 332 the operator may determine the offset, if any, between the two sets of tires 268 and 270. It may facilitate such comparison to manipulate the vehicle steering wheel (not shown) so as to bring the center marks 320 and 322 equal distances from the line 322, thus giving the offset between sets of tires directly.

Another variation of the method of the present invention is illustrated symbolically in FIG. 11, wherein a vehicle frame is indicated by number 334. As with regard to the method steps immediately preceding, it will be assumed that the pair of frames 260 and 262 on the set of tires 268 has already been used, with tape measures (not shown), to measure the toe-in of the tires 276 and 278. It will also be assumed herein that the pair of elastic bands 312 and 313 has already been disposed tautly between respective cross bars 280 and 286. Thus the operator projects a centerline 336 of the vehicle frame by means of the projection means (not shown) of the present invention. The operator then notes the positions of the center marks 316 and 318 of the elastic bands 312 and 313 with respect to the vehicle frame centerline 336. The operator might also measure the lateral offset of each of the center marks 316 and 318 of the elastic bands from the vehicle frame centerline 336 in order to more directly obtain the offset distance between the set of tires 268 and the vehicle frame centerline 336.

It should be noted that all of the above-described variations of the method of the present invention may be utilized with greatest accuracy if the method steps given above are preceded by driving or otherwise rolling the vehicle about 20' to 40' on a flat surface in order to cause the manifold steering system geometrics and tolerances to assume their natural running configurations under straight-ahead rolling conditions. The importance of this step can be most fully appreciated by referring to the above discussion of the prior art and the statement of invention.

Now it will be understood that the foregoing apparatus and method have been described with reference to a two-axle vehicle. This has been for purposes of example and clarity of explanation only. In the more general case, vehicles may have as many as five or six axles, some with more than two wheels mounted thereon. It is within the scope of the present invention to measure alignment of such multi-axle vehicles by the method taught hereinabove. It should also be understood that the steps of the foregoing method may be accomplished in various sequences. Many combinations are possible, as will be obvious to one skilled in the art. In particular, however, it should be noted that the measurement of toe-in does not absolutely depend upon manually snugging the cross bars against the respective tire side wall peripheries through the instrumentality of tape measures. It is possible that the tire cross bars be snugged against the tires by tautly disposing the elastic bands therebetween prior to taking any actual measurements with the tape measures. Since the elastic bands are uniform, equal tension at each end of the cross bars is assured, so as to prevent any potential unbalance in the measurements thus obtained.

Turning again to FIG. 12, the wheel alignment measuring apparatus, in accordance with the present invention described herein, and particularly shown in FIG. 12, may be used in a method for determining if a pair of coaxially mounted tires are parallel to one another, while the coaxially mounted tires are supporting the vehicle.

Use of the apparatus, in accordance with the method of the present invention, includes disposing a frame 20 against the outside sidewall of each of two coaxially mounted tires (not shown) and thereafter extending the biasing means, 101 between the front portions 121, 123, of each of the frames 20, 72 and between the rear portions 125, 127 of the frames 20, 72. Thereafter, the distance, D, between the regularly spaced stops 171 near each of the coaxially mounted tires is measured in the first wire means 141 between the tires and in the second wire means 161 between the tires.

Thereafter, the results of these measurements are compared. If this measurement, as indicated by the letter, D, is the same for similarly disposed stops on the biasing means 101, the wheels are in parallel alignment with one another. If the measurements are inconsistent, the tires are not so aligned.

Bearing wear may be determined, in accordance with the method of the present invention, by rolling a vehicle having a coaxially mounted tire, in one direction and braking the vehicle to a stop. Thereafter, a frame is disposed on the outside wall of each of the two coaxially mounted tires and the distance between the regularly spaced stops 171, measured in accordance with the hereinabove recited method for determining if the coaxially mounted tires are parallel.

Thereafter, the biasing means are removed and the vehicle is rolled in an opposite direction and braked to a stop and the frames and biasing means are replaced thereon and similar measurements made between the stops 171. If the distance between the stops is not the same, within an acceptable range, after forwardly rolling the vehicle to a stop, and rearwardly rolling the vehicle to a stop, excessive bearing wear may be indicated. The acceptable range is dependent upon the type of vehicle, and vehicle suspension, among many other factors, and is determined on an empirical basis.

Finally, a method, in accordance with the present invention, for making alignment measurements relative to front and rear sets of tires of a vehicle, utilizing the apparatus of the present invention shown in FIG. 12, includes the steps as hereinabove recited for placing the biasing means 101, across one set of coaxially mounted tires and thereafter extending biasing means 131, across the set of a second set of coaxially mounted tires. Thereafter, a line 301 is projected, which is defined by optically sighting the pointer 193 through the aperture 241 of an associated biasing means for alligning the tip 303 of the pointer 193 at a "6:00" position within the aperture 241.

Similarly a line 305 is projected by sighting a tip 307 of the pointer 197 through the aperture 245. Deviations, X,Y, of these lines with a center line 311, representing perfect alignment of the coaxially mounted wheels, is indicative of the misalignment of the automobile tires, and as hereinabove described, useful in taking corrective measures.

Accordingly, any and all modifications, variations, or equivalent arrangements, which may occur to those skilled in the art, should be considered to be within the scope of the invention as defined in the appended claims.

What is claimed is:

1. Wheel alignment measuring apparatus comprising:
a pair of frames, each adapted for engaging a sidewall of a tire; and,
biasing means for engaging said frames with the tire sidewalls of coaxially mounted tires while the coaxially mounted tires are supporting the vehicle on a road surface or the like,
said biasing means including a spring and an eleastic member, said spring and elastic member being connected in parallel between the frames.

2. Wheel alignment measuring apparatus comprising:
a pair of frames, each adapted for engaging a sidewall of a tire; and,
biasing means for engaging said frames with the tire sidewalls of coaxially mounted tires while the coaxially mounted tires are supporting the vehicle on a road surface or the like,
said biasing means including a first and a second spring and a first and a second elastic member, said first spring and first elastic member being connected in parallel between a front portion of each frame, said second spring and second elastic member being connected in parallel between a rear portion of each frame.

3. Wheel alignment measuring apparatus comprising:
a pair of frames, each adapted for engaging a sidewall of a tire;
biasing means for engaging said frames with the tire sidewalls of coaxially mounted tires while the coaxially mounted tires are supporting the vehicle on a road surface or the like,
said biasing means including a first and a second spring and a first and a second elastic member, said first spring and first elastic member being connected in parallel between a front portion of each frame extending beyond each tire toward the front of the vehicle, said second spring and second elastic member being connected in parallel between a rear portion of each frame extending beyond each tire toward the rear of the vehicle.

4. The wheel alignment measuring apparatus of claim 2 wherein the first and second spring and the first and second elastic member have a length substantially less than the distance between the coaxially mounted tires.

5. The wheel alignment measuring apparatus of claim 4 wherein the first spring and first elastic member are of approximately the same length and the second spring and second elastic member are of approximately the same length.

6. The wheel alignment measuring apparatus of claim 5 wherein the first and second springs and first and second elastic members are configured in order that the first and second springs provide the majority of the force for engaging the frames with the sidewalls.

7. The wheel alignment measuring apparatus of claim 6 further including center mark means attached to each of the elastic member means for optically indicating the mid-point between the coaxially mounted tires.

8. The wheel alignment measuring apparatus of claim 7 wherein the center mark means includes pointers clamped to edge portions of the elastic members midway between the coaxially mounted tires.

9. The wheel alignment meassuring apparatus of claim 4 futher including first wire means connected to opposite ends of the first spring and first elastic member and second wire means connected to opposite ends of the second spring and second elastic member, said first and second wire means being operative for connecting the first spring and first elastic member and the second spring and second elastic member in parallel between said coaxially mounted tires.

10. The wheel alignment measuring apparatus of claim 9 wherein the first and second wire means have regularly spaced apart stops fixed thereon for enabling the first spring and first elastic member and second spring and second elastic member to be connected between coaxially mounted tires having different distances therebetween.

11. The wheel alignment measuring apparatus claim 7 wherein the center marker means includes a pointer having means defining an apperature to enable optical sighting therethrough.

12. A method for determining if a pair of coaxially mounted tires are parallel to one another while said coaxially mounted tires are supporting a vehicle, said method comprising the steps of:
disposing a frame against an outside sidewall of each of two coaxially mounted tires;
extending first biasing means between a front portion of each frame, said first biasing means including first wire means for attaching said first biasing means to said frames, said first wire means including a plurality of regularly space apart stops fixed thereon for removably attaching said first biasing means to said frames,
extending second biasing means between a rear portion of each frame, said second biasing means including second wire means for attaching said second biasing means to said frames, said second wire means includes a plurality of regularly spaced apart stops fixed thereon for removably attaching said second biasing means to said frames;

measuring the distance between the regularly spaced stops in the first wire means between the tires, measuring the distance between the regularly spaced stops in the second wire means between the tires; and, comparing the results of the two herein above recited measurements.

13. A method for measuring vehicle wheel bearing wear comprising the steps of:

rolling a vehicle having coaxially mounted tires in one direction and braking the vehicle to a stop;

disposing a frame against an outside sidewall of each of two coaxially mounted tires;

extending first biasing means between a front portion of each frame, said first biasing means including first wire means for attaching said first biasing means to said frames, said first wire means including a plurality of regularly space apart stops fixed thereon for removably attaching said first biasing means to said frame;

extending second biasing means between a rear portion of each frame, said second biasing means including second wire means for attaching said second biasing means to said frames, said second wire means including a plurality of regularly spaced apart stops fixed thereon for removably attaching said second biasing means to said frames; including, measuring the distance between the regularly spaced stops in the first wire means between the tires, measuring the distance between the regularly spaced stops in the second wire means between the tires;

removing the frames from the coaxially mounted tires;

rolling the vehicle in an opposite direction and braking the vehicle to a stop;

disposing a frame against the outside sidewalls of each of two coaxially mounted tires;

extending the first biasing means between front portions of each frame;

extending the second biasing means between rear portions of each frame;

measuring the distance between the regularly spaced stops in the first wire means between the tires;

measuring the distance between the regularly spaced stops in the second wire means between the tires; and, comparing the results of the four hereinabove recited measurements.

14. A method for making alignment measurements relative to front and rear sets of tires of a vehicle comprising the steps of:

disposing a frame against an outside sidewall of each of one set of coaxially mounted tires;

extending first biasing means between a front portion of each frame, said first biasing means including center marker means including a pointer having an apperature therein;

extending second biasing means between a rear portion of each frame, said second biasing means including center marker means including a pointer having an apperature;

disposing a frame against an outside sidewall of each of another set of two coaxially mounted tires;

extending third biasing means between a front portion of each frame on said second set of coaxially mounted tires, said third biasing means including center marker means including a pointer having an apperature therein;

extending fourth biasing means between a rear portion of each frame on said second set of coaxially mounted tires, said fourth biasing means including a pointer having an apperature therein;

projecting a straight line defined by optically sighting a pointer of one of the first or second biasing means through the apperature of another of the first or second biasing means;

projecting a straight line defined by optically sighting a pointer of one of the third or fourth biasing means through the apperature of another of the third or fourth biasing means; and, comparing the hereinabove projections.

15. A method for making alignment measurements relative to front and rear sets of tires of a vehicles comprising the steps of:

disposing a frame against an outside sidewall of each of one set of coaxially mounted tires;

extending first biasing means between a front portion of each frame, said first biasing means including center marker means including a pointer having an apperature therein;

extending second biasing means between a rear portion of each frame, said second biasing means including center marker means including a pointer having an apperature;

projecting a straight line defined by optically sighting a pointer of one of the first or second biasing means through the apperature of another of the first or second biasing means;

recording the projected straight line;

removing the frames from the one set of coaxially mounted tires;

disposing a frame against an outside sidewall of each of another set of coaxially mounted tires;

extending the first biasing means between a front portion of each frame, said first biasing means including center marker means including a pointer having an apperature therein;

extending the second biasing means between a rear portion of each frame, said second biasing means including a pointer having an apperature;

projecting a second straight line defined by optically sighting a pointer of one of the first or second biasing means through the apperature of another of the first or second biasing means;

recording the second projected straight line; and, comparing the hereinabove recorded straight line projections.

* * * * *